(12) United States Patent
Heim

(10) Patent No.: US 12,128,702 B2
(45) Date of Patent: Oct. 29, 2024

(54) METHOD FOR PRODUCING A SECURITY ELEMENT COMPRISING MICRO-IMAGING ELEMENTS

(71) Applicant: GIESECKE+DEVRIENT CURRENCY TECHNOLOGY GMBH, Munich (DE)

(72) Inventor: Manfred Heim, Bad Tolz (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 18/546,852

(22) PCT Filed: Feb. 18, 2022

(86) PCT No.: PCT/EP2022/025057
§ 371 (c)(1),
(2) Date: Aug. 17, 2023

(87) PCT Pub. No.: WO2022/174982
PCT Pub. Date: Aug. 25, 2022

(65) Prior Publication Data
US 2024/0140125 A1 May 2, 2024

(30) Foreign Application Priority Data
Feb. 19, 2021 (DE) ...................... 10 2021 000 879.0

(51) Int. Cl.
| | | |
|---|---|---|
| B42D 25/342 | (2014.01) | |
| B42D 25/29 | (2014.01) | |
| B42D 25/425 | (2014.01) | |
| B42D 25/445 | (2014.01) | |

(52) U.S. Cl.
CPC ............ *B42D 25/342* (2014.10); *B42D 25/29* (2014.10); *B42D 25/425* (2014.10); *B42D 25/445* (2014.10)

(58) Field of Classification Search
CPC .... B42D 25/342; B42D 25/29; B42D 25/425; B42D 25/445
USPC ................................ 283/67, 72, 94, 98, 901
See application file for complete search history.

(56) References Cited

U.S. PATENT DOCUMENTS

| | | | |
|---|---|---|---|
| 7,821,716 | B2 | 10/2010 | Staub et al. |
| 8,367,277 | B2 | 2/2013 | Brehm et al. |
| 2008/0310025 | A1 | 12/2008 | Staub et al. |

(Continued)

FOREIGN PATENT DOCUMENTS

| | | |
|---|---|---|
| EP | 1846253 B1 | 9/2008 |
| EP | 2049345 B1 | 6/2013 |
| EP | 1695121 B1 | 6/2014 |

(Continued)

OTHER PUBLICATIONS

International Search Report from corresponding PCT Application No. PCT/EP2022/025057, Jun. 3, 2022.

*Primary Examiner* — Justin V Lewis
(74) *Attorney, Agent, or Firm* — Workman Nydegger

(57) ABSTRACT

A method for producing a security element for security papers, valuable documents or the like, includes a carrier having on its top side micro-imaging elements and on its underside structures which, together with the microimaging elements, image a motif in front of the top side of the carrier; the position of the motif being is dependent on the viewing angle.

8 Claims, 2 Drawing Sheets

(56) References Cited

U.S. PATENT DOCUMENTS

2009/0317595 A1    12/2009  Brehm et al.
2012/0268598 A1*   10/2012  Holmes .................. B42D 25/40
                                                       348/143

FOREIGN PATENT DOCUMENTS

| EP | 1893074 | B2 | 6/2017 |
| EP | 2493698 | B1 | 10/2018 |
| EP | 3580067 | A1 | 12/2019 |
| WO | 2011051668 | A1 | 5/2011 |
| WO | 2017184581 | A1 | 10/2017 |
| WO | 2020095049 | A1 | 5/2020 |

* cited by examiner

METHOD FOR PRODUCING A SECURITY ELEMENT COMPRISING MICRO-IMAGING ELEMENTS

BACKGROUND

The invention relates to a method for producing a security element for security papers, valuable documents, or the like, having a carrier which includes micro-imaging elements on its upper side and structures on its lower side which, together with the micro-imaging elements, depict a motif in front of the upper side of the carrier, wherein the location of the motif is dependent on the viewing angle.

Such arrangements are known from the prior art, for example from EP 3580067 A1, EP 1695121 B1, EP 1893074 B2, EP 2493698 B1, EP 1846253 B1, or EP 2049345 B1, and are marketed as products, for example, by Crane under the trademark names "Motion", "Rapid", and "Surface", by de La Rue under the trademark name "Active", or by Kurz under the trademark name "zero.zero". However, only very few companies control the methods for producing these products and they are costly and complicated. For example, the products "Motion" and "Rapid" require a complex so-called "color filling method" in their production in order to house color designs or motifs in these products.

SUMMARY

The invention is therefore based on the object of refining a generic security element such that the disadvantages of the prior art are remedied and the protection from counterfeits is further increased.

This object is achieved by the features of the independent claim. Refinements of the invention are the subject matter of the dependent claims.

According to the invention, in method step [1.1], first a translucent or transparent carrier is provided, which includes an upper side and a lower side. In method step [1.2], a first embossing layer is applied to the upper side of the carrier and, in method step [1.3], multiple micro-imaging elements are introduced into the side of the first embossing layer facing away from the carrier. In method step [1.4], a second embossing layer is applied to the lower side of the carrier and, in method step [1.5], multiple embossing structures are introduced into the side of the second embossing layer facing away from the carrier. The second embossing layer is at least nearly flat between the respective embossing structures. The side of the second embossing layer facing away from the carrier therefore has an at least nearly flat surface, into which embossing structures are introduced, for example, by means of an embossing method known from the prior art. In addition to a single embossing layer, multiple lacquers can also be arranged one on top of another here, into which the structures are subsequently embossed. The use of multiple embossing lacquer layers can have advantages with respect to adhesion on the carrier, profile, homogeneity of the lacquer layer, embossing capability, perfection of the dimensional accuracy of the embossing structures, improving the circulation stability, avoiding tendencies toward soiling, and the like. The embossing structures form, together with the micro-imaging elements, an arrangement which depicts a motif in front of the upper side of the carrier, wherein the orientation of the motif is dependent on the viewing angle. Subsequently, in method step [1.7], a metallic layer is applied over the entire surface to the side of the second embossing layer facing away from the carrier. In following method step [1.8], the metallic layer is removed from the embossing structures using an etching method. In this case, the metallic layer remains in areas in which the second embossing layer is at least nearly flat between the respective embossing structures. For an observer who observes the security element from the upper side, a motif in the form of a light-dark contrast results due to the metallic coating and due to the embossing structures or the gaps thus formed in the metallic coating.

According to one preferred embodiment, in a following method step [1.9], at least one ink layer is applied at least partially, preferably over the entire surface, to the embossing structures and the areas in which the second embossing layer is at least nearly flat between the respective embossing structures. The at least one ink layer is visible here to an observer who observes the security element from the upper side through the embossing structures or the gaps of the metallic coating thus formed, so that the security element displays a single-color or multicolored motif.

It is known from the prior art that an NaOH solution having well-defined concentration at well-defined temperature is used for the etching process. The etching process is then typically stopped by a neutralization and the carrier is then rinsed and dried. The last two steps prevent gradual progression of the etching process in the finished or semi-finished product. The exposure of the carrier to the etching solution for a very well-defined time is important for the etching, which is selected so accurately that the metallic layer predominantly disappears on the embossing structures or becomes transparent due to chemical reaction, whereas it still remains essentially opaque in the adjacent, at least nearly flat areas. The metallic layer typically consists of aluminum, which is etched using the described processes. Alternatively, phosphoric acid can also be used for the etching process.

For an alternative, well-defined etching method, a photosensitive resist lacquer can also be coated on the metal layer. These photosensitive resist lacquers can be designed so that they chemically change due to exposure so that they become soluble in an etching solution and release the metallic layer for the etching process. The photosensitive resist lacquers can also have the contrary property, however. They are then first chemically cross-linked by the exposure so that they develop a protective effect against the etching solution.

In the exposure of the carrier having the microstructures embossed on both sides from the upper side, the exposure can be selected so that a photosensitive resist lacquer which was coated on the metallic layer is chemically changed in the area of the embossing structures so that it is only removed in the area having the metallic layer in the subsequent etching step. This etching process using a photosensitive resist lacquer has the advantage that it often selects better between the area having embossing structures and the at least nearly flat area and is thus less susceptible to error.

According to the invention, the surface of the second embossing layer is enlarged in the area of the embossing structures by the embossing structures, because the surface of the second embossing layer becomes uneven or rough due to the embossing structures. The surface of the embossing layer is thus increased or enlarged with respect to an area unit of the area of the embossing layer in projection perpendicularly to the (non-embossed) embossing layer of, for example, 1 mm$^2$ in the area of the embossing structures by particularly preferably at least 20% in relation to the areas between the respective embossing structures, which are at least nearly flat. Upon application of the metallic layer to the second embossing layer, particularly preferably by means of vacuum vapor deposition of the surface (PVD or CVD), galvanically, by means of atmospheric plasma, or by means of printing, wherein the printing mechanism moves with a uniform movement over the surface of the second embossing layer, less material of the metallic layer is therefore applied to the embossing structures due to their enlarged real surface than in the at least nearly flat areas between the embossing structures. The metallic layer thus has a greater thickness in the at least nearly flat areas between the embossing structures than in the area of the embossing structures. In the etching method, the thinner metallic layer on the embossing structures is nearly or completely removed here, whereas the thicker metallic layer on the at least nearly flat areas between the embossing structures remains. The thickness of the metallic layer on the at least nearly flat areas between the embossing structures is possibly reduced somewhat by the etching method, but a continuous metallic layer remains in these areas.

The embossing structures thus have the result that the effective layer thickness of the applied metallic layer is reduced there in relation to the surrounding areas.

According to the invention, the second embossing layer being "at least nearly flat" in the areas between the embossing structures does not mean that no embossing structures are located in the "at least nearly flat" areas. Rather, other embossing structures can certainly be arranged in these areas, but can only enlarge the surface of the embossing layer slightly such that a continuous metallic layer remains there after the etching method. For example, in addition to the embossing structures which enable the etching demetallization at these points, smaller embossing structures can be introduced into the second embossing layer in some areas in the at least nearly flat areas between the embossing structures, which do not result in the metallic layer being etched away. In this way, for example, additional colored micro-images for lens effects can be integrated by means of nanostructures.

The other embossing structures thus only have to be such that their effect on the surface area increase is significantly less than the embossing structures which enable the etching demetallization at these points. These are, for example, holograms having a typical height of 100 nm to 500 nm or micromirrors having a height of less than 2 µm. The further embossing structures in particular can only increase the surface area of the second embossing layer by less than 20% in relation to the areas having the embossing structures which enable the etching demetallization at these points.

According to one preferred embodiment, it is provided that the embossing structures have a height or depth of at least 2 µm to 3 µm. If the embossing structures are introduced into the second embossing layer by means of a high embossing method, in which the structures to be embossed protrude out of the embossing tool, they form depressions in the second embossing layer. In contrast, if the embossing structures are introduced into the second embossing layer by means of a deep embossing method, in which the structures to be embossed protrude into the embossing tool, they form elevations in the second embossing layer.

According to a further preferred embodiment, it is provided that after method step [1.9], a further metallic layer is applied to the side of the at least one ink layer facing away from the carrier. The at least one ink layer typically consists of transparent inks, the brilliance, luminosity, color saturation, and/or contrast of which is increased by applying a further metallic layer lying behind them in the viewing direction.

The one or more ink layers can form a macroscopic multicolored motif, which then only appears under a predefined observation angle range.

It may also be particularly preferably effectuated that two or more colored motifs alternate in different observation conditions. For this purpose, photosensitive inks are coated under the etched metal, which change their color, for example, due to laser exposure from a defined angle of incidence.

Furthermore, further security features can be concealed behind this further metallic layer, for example magnetic layers which cannot be optically recognized by a counterfeiter.

According to a further preferred embodiment, it is provided that the micro-imaging elements are formed by focusing elements, for example, lenses or concave mirrors, and the embossing structures are arranged at least partially in the focal plane of the micro-imaging elements. The focusing elements can also be formed without surface topography in that they consist of a material having an index of refraction n1, which preferably differs by at least 0.3 from the index of refraction n2 of an embedding matrix surrounding them.

According to a further preferred embodiment, it is provided that the first and the second embossing layer are each formed by an embossing lacquer which is printed on the carrier.

The carrier particularly preferably consists of a plastic film, which consists, for example, of polyethylene terephthalate (PET).

Translucence in the meaning of this invention means that an object such as the substrate or the plastic film lets incident light pass through in a certain proportion. If light is incident on one side of the object, a certain proportion of the light is let through up to the other side of the object and exits again there. The greater the percentage proportion of the light passing through is in relation to the incident light, the more translucent is the object. If the percentage proportion is at least 90%, i.e., the object lets the incident light pass through nearly unattenuated as with a window, the object is designated as transparent. In contrast, an object which lets less than 10% and preferably approximately 0% of the incident light pass through, i.e., in which the proportion of the light passing through in relation to the incident light is low or is nearly or equal to zero, is designated as opaque or as non-light-transmissive.

Valuable documents, for which a security element produced using the method according to the invention can be used, are in particular banknotes, stocks, bonds, documents, certificates, checks, high-value tickets, but also other papers in danger of counterfeiting, such as passports and other identification documents, as well as cards, such as credit or debit cards, the card body of which includes at least one layer of a security paper, and also product security elements, such as labels, seals, packages, folding boxes, package inserts, and the like.

The simplified designation valuable document includes all above-mentioned materials, documents, and product security means.

The terms "upper side" or "lower side" of the carrier are relative terms, which can also be designated as "the one" and "the opposite" side. The "upper side" designates in this case the side of the carrier facing toward an observer of the security element. Both sides form the predominant component of the overall surface of the carrier. These terms expressly do not comprise the lateral surfaces of the carrier, which are negligibly small at a thickness of the carrier that is only fractions of a millimeter and typically are not provided or cannot be provided with security elements or coatings.

A motif in the meaning of this invention is a representation which is designed in the form of a pattern and is visually perceptible. This can form, for example, an alphanumeric character sequence made up of numbers and/or letters, a graphic depiction, an image, a text, or other characters. The information particularly preferably consists here of positive and/or negative motifs. In a positive motif, a motif element itself is applied to the substrate for this purpose, whereas in a negative motif, the area surrounding the motif element is applied to the substrate. A positive motif is, for example, a letter printed in dark ink on the light substrate. A negative motif is, for example, an area applied in dark ink to the light substrate, which includes an unprinted area in the form of a letter within the area.

It is apparent that the above-mentioned features and the features still to be explained hereinafter are usable not only in the indicated combinations, but also in other combinations, without leaving the scope of the present invention, insofar as included by the scope of protection of the claims.

BRIEF DESCRIPTION OF THE DRAWINGS

The advantages of the invention will be explained on the basis of the following exemplary embodiments and the supplementary figures. The exemplary embodiments represent preferred embodiments, to which the invention is in no way to be restricted, however. Furthermore, the representations in the figures are shown very schematically for better comprehension and do not reflect the real conditions. In particular, the proportions shown in the figures do not correspond to the relationships existing in reality and are used exclusively to improve the clarity. Furthermore, the embodiments described in the following exemplary embodiments are reduced to the essential core information for better comprehension. In the practical implementation, significantly more complex patterns or images can be used.

In the schematic figures:

FIG. 1, including

DETAILED DESCRIPTION OF VARIOUS EMBODIMENTS

Figure 1A:
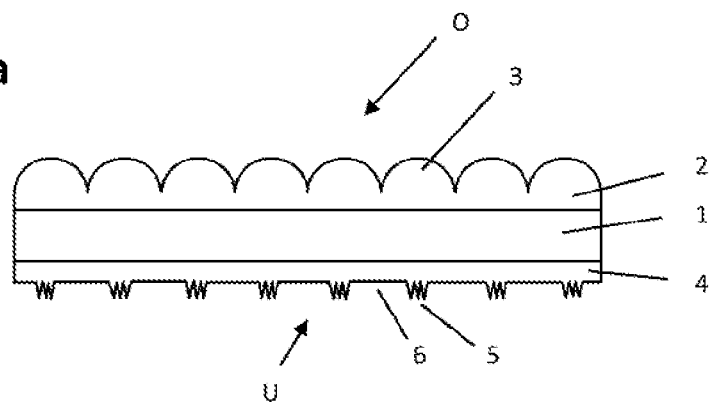
FIGS. 1a to 1d, shows the method according to the invention for producing a security element and in this case shows individual successive method steps in FIG. 1a to FIG. 1b.

FIG. 1 schematically shows the method according to the invention for producing a security element. In this case, FIG. 1a shows a translucent carrier 1, which includes an upper side O and a lower side U. A first embossing layer 2 is applied to the upper side of the carrier 1 and multiple micro-imaging elements 3 in the form of micro-lenses are introduced into the side of the first embossing layer 2 facing away from the carrier 1. A second embossing layer 4 is applied to the lower side of the carrier 1 and multiple embossing structures 5 are introduced into the side of the second embossing layer 4 facing away from the carrier 1. The second embossing layer 4 is at least nearly flat in the areas 6 between the respective embossing structures 5. The side of the second embossing layer 4 facing away from the carrier 1 therefore has an at least nearly flat surface into which embossing structures are introduced, for example, by means of an embossing method known from the prior art.

Figure 1B:
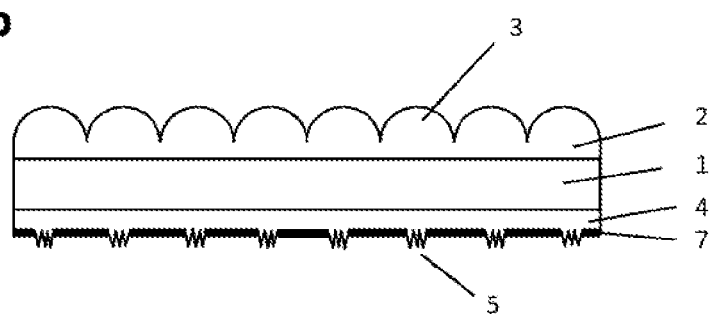

In FIG. 1b, a metallic layer 7 has been applied to the entire surface on the side of the second embossing layer 4 facing away from the carrier 1 and the metallic layer 7 was washed away from the embossing structures 5 using an etching method. The metallic layer 7 is therefore only still present in the areas 6 in which the second embossing layer 4 is at least nearly flat between the respective embossing structures 5.

Figure 1C:
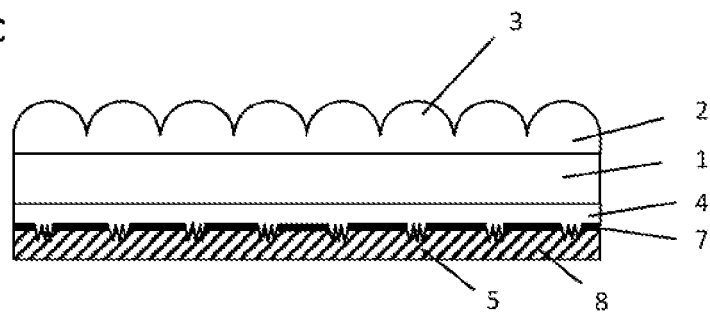

In FIG. 1c, an ink layer 8 has been applied to the metallic layer 7 and the areas 6. The security element displays a single-color motif in this case.

Figure 1D:
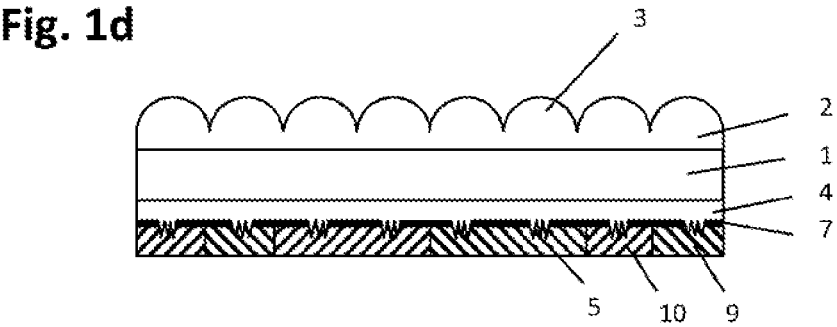

Alternatively, according to FIG. 1d, two ink layers 9 and 10 can also be applied to the metallic layer 7. The security element displays a two-color motif in this case.

Figure 2:
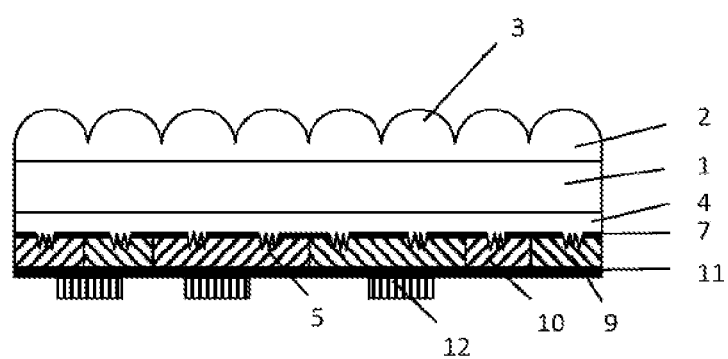
FIG. 2 shows an exemplary embodiment of a security element produced using the method according to the invention.

FIG. 2 shows an exemplary embodiment of a security element produced using the method according to the invention, in which a further metallic layer 11 is applied over the full surface to the metallic layer 7 from FIG. 1d.

The further metallic layer 11 increases the brilliance, luminosity, color saturation, and/or contrast of the ink layers 9 and 10. Furthermore, further security features can be concealed behind the further metallic layer 11, for example, magnetic layers 12, which cannot be optically recognized by a counterfeiter.

Figure 3:
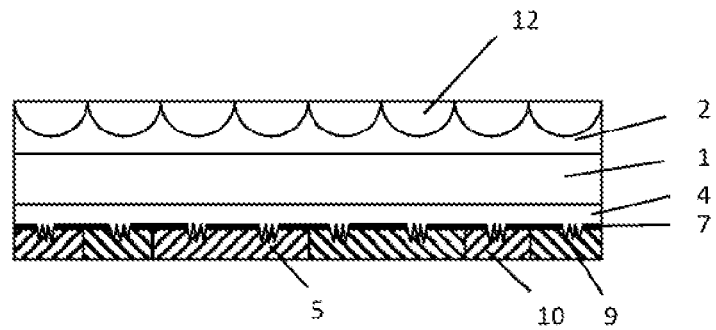
FIG. 3 shows a further exemplary embodiment of a security element produced using the method according to the invention.

FIG. 3 shows a further exemplary embodiment of a security element produced using the method according to the invention. The micro-imaging elements are not formed in this case by exposed lenses, which can easily be molded by a counterfeiter. Rather, the micro-imaging elements consist of lenses 12 made of highly refractive material, which are completely embedded in an embossing layer 2 made of a medium having low refraction.

The invention claimed is:

1. A method for producing a security element, wherein
a translucent or transparent carrier is provided, which includes an upper side and a lower side,
a first embossing layer is applied to the upper side of the carrier,
multiple micro-imaging elements are introduced into a side of the first embossing layer facing away from the carrier,
a second embossing layer is applied to the lower side of the carrier,
multiple embossing structures are introduced into a side of the second embossing layer facing away from the carrier, wherein a surface area of the second embossing layer in an area of the embossing structures is increased by at least 20% in relation to areas between the respective embossing structures,
wherein the embossing structures together with the micro-imaging elements depict a motif in front of the upper side of the carrier, wherein an orientation of the motif is dependent on a viewing angle,
a metallic layer is applied to a full surface on the side of the second embossing layer facing away from the carrier,
wherein the metallic layer is removed from the embossing structures using an etching method and remains in the areas between the respective embossing structures in which the second embossing layer is sufficiently flat that a continuous metallic layer remains there after the etching method.

2. The method according to claim 1, wherein in a further step, at least one ink layer is applied to the embossing structures and the areas between the respective embossing structures.

3. The method according to claim 1, wherein the embossing structures have a height or depth of at least 2 μm to 3 μm.

4. The method according to claim 1, wherein the micro-imaging elements are formed by focusing elements and the embossing structures are at least partially arranged in a focal plane of the micro-imaging elements.

5. The method according to claim 4, wherein the focusing elements comprise lenses or hollow mirrors.

6. The method according to claim 1, wherein the first embossing layer and the second embossing layer are each formed by an embossing lacquer, which is printed onto the carrier.

7. The method according to claim 1, wherein the security element is applied to security papers or valuable documents.

8. The method according to claim 2, wherein a further metallic layer is applied to a side of the at least one ink layer facing away from the carrier.

* * * * *